United States Patent [19]

Caudill et al.

[11] Patent Number: 4,643,607

[45] Date of Patent: Feb. 17, 1987

[54] FURNITURE CONSTRUCTION

[75] Inventors: William Caudill; Frank Klimezky, both of Lake Worth, Fla.

[73] Assignee: Gulfstream Goodwill Industries, Inc., West Palm Beach, Fla.

[21] Appl. No.: 786,217

[22] Filed: Oct. 10, 1985

[51] Int. Cl.⁴ .............................................. F16B 9/00
[52] U.S. Cl. ..................................... 403/194; 403/246
[58] Field of Search ............... 403/246, 233, 237, 191, 403/194, 201, 245, 252, 234

[56] References Cited

U.S. PATENT DOCUMENTS

| | | | |
|---|---|---|---|
| 1,972,997 | 9/1934 | Junkers | 403/237 |
| 3,598,433 | 8/1971 | Savickas | 287/54 C |
| 3,850,534 | 11/1974 | O'Halloran | 403/190 |
| 3,985,460 | 10/1976 | Piper et al. | 403/234 |
| 4,017,199 | 4/1977 | Strassle | 403/264 |
| 4,238,117 | 12/1980 | Newman | 256/65 |
| 4,355,919 | 10/1982 | Lievonen | 403/191 |

FOREIGN PATENT DOCUMENTS

| | | | |
|---|---|---|---|
| 448527 | 10/1936 | United Kingdom | 403/234 |
| 950644 | 2/1964 | United Kingdom | 403/194 |

Primary Examiner—Andrew V. Kundrat
Attorney, Agent, or Firm—Steele, Gould & Fried

[57] ABSTRACT

A furniture construction is provided wherein a first tubular member is joined at an end to the side of a second tubular member. A tubular fitting having a first end portion and a second end portion has an outside diameter substantially matching the inside diameter of the first tubular member. The first end portion of the fitting is received into the end of the first tubular member in a snuggly interfitted relationship. Apertures in the fitting align with apertures in the first tubular member to receive fastening means. The second end portion of the fitting is received by the second tubular member through a bore in the side of the second tubular member. The second end portion of the fitting abuts and is contoured to match the interior contour of the second tubular member such that the second end portion is substantially completely in contact with the interior contour of the second tubular member. Apertures in the second end portion of the fitting are adapted to receive fastening means in a substantially parallel and adjacent axial alignment with the interior wall of the second tubular member adjacent the bore in the second tubular member.

15 Claims, 4 Drawing Figures

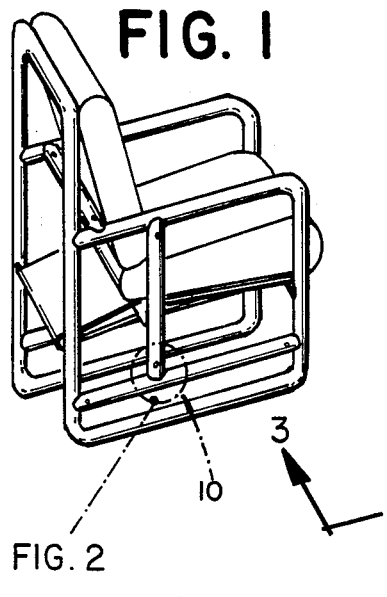
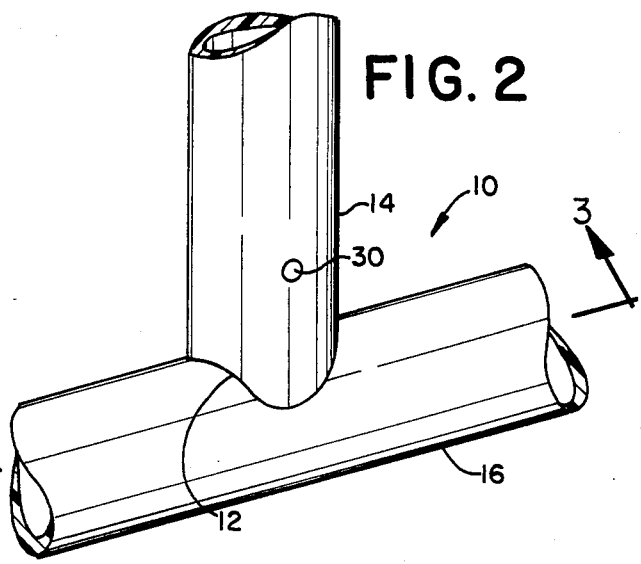
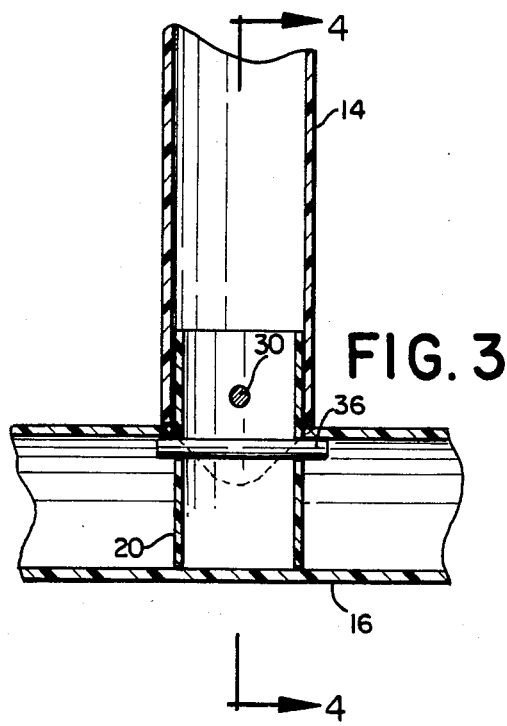
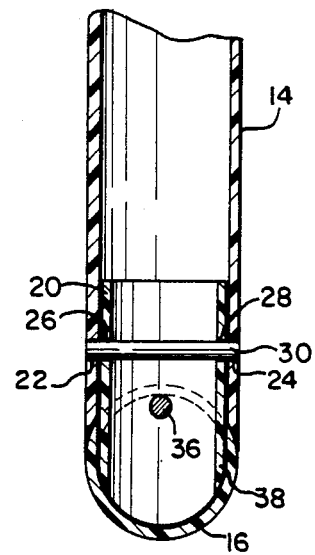

FURNITURE CONSTRUCTION

BACKGROUND OF THE INVENTION

1. Field of the Invention

This invention relates generally to a furniture construction, and more particularly to a joint for securing together tubular components of furniture.

2. Description of Prior Art

Tubular furniture is a desirable alternative to other furniture constructions because it is lightweight, strong, relatively simple to manufacture, and relatively inexpensive. When manufactured from the popular PVC tubes, this furniture is weather resistant and thus ideal for outdoor use.

In tubular furniture constructions it is usually necessary to connect the end of a first tubular member to the side of a second tubular member. The manner in which the tubular components of this furniture are secured together has been the subject of a number of inventions, these inventions being directed towards strong yet attractive joints. It is esthetically desirable that the components of the joint are not readily noticeable to the casual observer. Savickas, U.S. Pat. No. 3,598,433, discloses a molded plastic fitting with a first end having a face axially recessed to fit the side of the second tubular member, and another end which is dimensioned to fit inside the end of the first tubular member. The fitting is secured in place by a screw.

O'Halloran, U.S. Pat. No. 3,850,534, discloses a chair connector comprising a fitting with one end having a face which is axially recessed to fit the side of the second tubular member, and dimensioned to fit inside the end of the first tubular member. The fitting is secured to the second tubular member by a pin and retained within the end of the first tubular member.

Piper, et al., U.S. Pat. No. 3,985,460, disclose a frame seat wherein tubular rails are joined by a fitting having an end with a face recessed to axially fit the side of the second tubular member and another end dimensioned to fit inside the first tubular member. A cylindrical outer end portion extends from the recessed end of the fitting into the second tubular member, and has a bore such that a screw through the second tubular member passes through the bore and threadably engages wedge means in the portion of the fitting within the first tubular member. Tightening the screw draws the wedge against cooperating wedge surfaces to tighten the joint.

Strassel, U.S. Pat. No. 4,017,199, discloses a joint wherein the first tubular member receives a fitting with a T-end, which is received by a cooperating bore molded into the second tubular member.

Newman, U.S. Pat. No. 4,238,117, discloses a fitting with an end dimensioned to be received into the first tubular member and held there by suitable means such as welding. The opposite end is joined to the second tubular member by a weld such that the weld is exposed only on the inner periphery of the fitting.

The foregoing patents disclose joints which are variously undesirable because of the cost of manufacture, the difficulty in assembling the joint, the strength of the joint, and the difficulty in adapting the joint to secure tubular members which are not joined at right angles to one another.

SUMMARY OF THE INVENTION

It is an object of the invention to provide a joint for securing together tubular furniture components which provides an esthetically pleasing appearance.

It is another object of the invention to provide a joint which is strong and secure.

It is yet another object of the invention to provide a joint which is easily manufactured from commonly found components.

It is still another object of the invention to provide a joint which can secure together tubular components at a variety of relative angles.

These and other objects are accomplished by a joint having a tubular fitting with a first end portion and a second end portion. The outside diameter of the fitting is smaller than but substantially matches the inside diameter of a first tubular member such that the first end portion of the fitting can be received into the end of the first tubular member in a snuggly interfitted relationship. Apertures in the fitting and the first tubular member are adapted to align and receive fastening means such as a pin, whereby the first end portion of the fitting is secured to the first tubular member.

The second end portion of the fitting is received by a second tubular member through a bore in the side of the second tubular member. The second end portion of the fitting abuts and is contoured to match the interior contour of the second tubular member. The second end portion of the fitting then is substantially completely in contact with the interior contour of the second tubular member.

Apertures in the fitting are adapted to receive fastening means such as a pin in a substantially axial and adjacent alignment with the interior wall of the second tubular member adjacent the bore in the second tubular member. The pin is longer than the diameter of the bore such that when in place it will prevent removal of the fitting. The pin so received and the contoured second end portion securely retain the fitting within the second tubular member, providing a strong yet easily assembled joint.

The end of the first tubular member is preferably contoured to fit the side exterior surface of the second tubular member such that internal joint components are not visible to the casual observer. The pin through the first tubular member can be manufactured in a color matching the color of the tubular components so as not to be readily visible.

BRIEF DESCRIPTION OF THE DRAWINGS

There are shown in the drawings embodiments which are presently preferred it being understood, however, that this invention is not limited to the precise arrangements and instrumentalities shown.

FIG. 1 is a perspective of a tubular chair formed with joints according to the present invention.

FIG. 2 is a perspective of a joint according to the present invention.

FIG. 3 is a cross section taken along line 3—3 in FIG. 2.

FIG. 4 is a cross section taken along line 4—4 in FIG. 3.

DESCRIPTION OF THE PREFERRED EMBODIMENTS

With reference to FIGS. 1-4, a joint 10 is provided to join an end 12 of a first tubular member 14 to the side of a second tubular member 16. A tubular fitting 20, having a first end portion and a second end portion has an outside diameter smaller than but approximating the inside diameter of the first tubular member 14. The first end portion of the fitting 20 can then be snuggly inserted into the end 12 of the first tubular member 14. Apertures 22, 24 in the first tubular member align with apertures 26, 28 in the fitting 20 near the first end portion of the fitting 20 such that a pin 30 or other fastening means may be inserted to secure the fitting 20 to the first tubular member 14.

A bore is provided in the side of the second tubular member 16 with a diameter greater than that of the outside diameter of the fitting 20 but less than that of the outside diameter of the first tubular member such that the fitting 20 may snuggly pass through into the annular space of the second tubular member 16 with the end 12 of the first tubular member abutting the exterior of the second tubular member. The second end portion 38 of the fitting 20 is contoured to match and snuggly rest against the interior wall of the second tubular member 16 to increase the strength and stability of the joint.

Apertures are provided in the fitting 20 and are aligned so as to receive a fastening pin 36 or the like. The position of the apertures should be such that the pin 36 is held substantially axially aligned with and adjacent to the interior wall of the second tubular member 16 adjacent the bore, as shown in FIG. 3. The fastening pin 36 is longer than the diameter of the bore and would then prevent removal of the fitting. The contoured second end portion 38 abutting the interior wall of the second tubular member 16 would resist sideways movement, such that the fitting would be securely held in position.

The fitting 20 is preferably made from a strong and rust-resistant material such as PVC. The fitting should preferably be dimensioned to extend through the second tubular member 16 into the end of the first tubular member 14 sufficiently to form a solid joint. The length of the fitting required will vary according to the size of the tubular members to be joined, although a fitting approximately 3" in length works well for many furniture constructions.

Although the fitting is herein described as tubular, it would be apparent to one skilled in the art that other formations would be possible within the spirit of the invention, such as a solid cylinder. These generally are not preferable to a tubular fitting due to cost and weight considerations.

The pins 30, 36 are preferably formed from a durable material such as aluminum or stainless steel. The pins should be slightly larger in diameter than the apertures such that the pins can be pressed tightly into place. The pins are preferably tapered to provide a wedge effect for a tight, secure fit. It may also be desirable to taper the apertures. It would be possible, though not preferable, to otherwise secure the pins in the apertures, as by gluing.

The pin 30 should be about equal in length to the outside diameter of the first tubular member 14 such that it does not extend beyond the exterior surface of the first tubular member 14 when pressed into place. This provides a smooth appearance. It is also desirable to round the heads of the pin 30 to match the contour of the exterior surface of the first tubular member 14, and to match the color of the pin 30 with the color of the first tubular member 14, to provide a very even and esthetically pleasing appearance. The pin 36 should be of a length greater than that of the diameter of the bore, preferably by about ½-1 inch, so that it may securely abut the interior surface of the second tubular member 16 adjacent the bore and prevent removal of the fitting.

The joint may be quickly and easily fashioned and assembled. The end 12 of the first tubular member 14 is ground to a recessed form to allow mating with the exterior surface of the second tubular member 16, thus providing a smooth and even fit as shown in FIG. 1. The second end portion 38 of the fitting 20 is ground such that it can mate with the interior surface of the second tubular member 16. A bore is created in the side of the second tubular member 16 to receive the fitting 20. The fitting 20 is inserted into the second tubular member 16 through the bore. It may be desirable to apply glue, such as a suitable PVC cement, to the end 38 of the fitting 20 to secure it to the inside wall of the second tubular member 16. A pair of apertures are drilled into the tubular fitting 20 to receive the fastening pin 36 and hold it in an alignment substantially coaxial with and adjacent to the interior wall of the second tubular member 16. It is preferable that a side of the pin 36 extend a short distance into a groove fashioned in the wall of the second tubular member 16. This can be accomplished by drilling the apertures through the fitting after the fitting has been glued into place, and using a particular drill guide. The drill guide should be partially open at its side. The drill guide should be aligned with the open portion facing the adjacent wall such that a portion of the drill bit cuts a groove in the side wall of the second tubular member as it cuts through the fitting 20. The pin 36 is pressed through the apertures to secure the fitting in place with a side of the pine 36 snuggly resting in the groove.

The first tubular member 14 is snuggly fitted over the first end portion of the fitting 20 and the drill bit is passed through the connection to form apertures 22, 24 and 26, 28 for the pin 30. Alternatively, preformed apertures 22, 24 and 26, 28 could be aligned. Pin 30 is then pressed into place or otherwise fastened to secure the joint together.

The contour of the end 12 of the first tubular member 14 provides an even fit at the side of the second tubular member 16 such that the fitting 20 is not visible from the outside. The pin 30 may be painted or otherwise colored to match the color of the first tubular member 14. The ends of the pin 30 are preferably cut and contoured to be flush with the exterior surface of the first tubular member 14 to provide a smooth and even appearance. The pin 30 is not then readily visible to the casual observer. The joint so constructed is then esthetically appealing since none of its components are readily visible from the exterior and thus do not detract from the overall appearance of the piece of furniture.

The joint construction of the invention is easily applied to joints wherein the tubular members are to be joined at relative angles other than right angles. The bore through the side of the second tubular member 16 would be formed at the appropriate angle. The second end portion 38 of the fitting 20 would be contoured to correspond to the interior portion of the second tubular member 16 at that angle. The apertures in the fitting 20 which receive the fastening pin 36 would be drilled at an angled alignment to the fitting 20 such that the pin 36 would be properly positioned axially aligned with and adjacent to the interior wall of the second tubular member 16 nearest the bore, with preferably a portion of the side of the pin 36 extending into a groove fashioned in the wall of the second tubular member 16. The end 12 of the first tubular member 14 would be matched to receive the exterior surface of the second tubular member 16 at the appropriate angle.

The joint construction according to the present invention is particularly suitable for tubular furniture constructions such as PVC furniture. It should be appreciated, however, that the present invention could also be applied to a variety of joints wherein tubular members are to be joined. This invention may also be embodied in other specific forms without departing from the spirit or essential attributes thereof, and accordingly, reference should be made to the appended claims, rather than to the foregoing specification, as indicating the scope of the invention.

I claim:

1. A connection comprising:
   a tubular fitting member;
   a first tubular member having a bore adapted to receive said tubular fitting member;
   a second tubular member having an inside diameter slightly larger than the outside diameter of said tubular fitting member to receive said tubular fitting member and having an end portion adapted to engage said first tubular member;
   a first fastening means to secure said tubular fitting member within said first tubular member, said tubular fitting member having an end portion contoured to and fittingly engaging the interior contour of said first tubular member; and,
   a second fastening means to secure said tubular fitting member withing said second tubular member.

2. The connection of claim 1 wherein said first fastening means comprises stop means engageable to said tubular fitting member within said first tubular member and abutting said first tubular member around said bore when said tubular fitting member is urged in a removal direction, wherein removal of said tubular fitting member is prevented.

3. The connection of claim 2 wherein said stop means comprises at least one pin means engaging said fitting through at least one aperture in said fitting.

4. The connection of claim 3 wherein said at least one pin means is held in a substantially coaxial and adjacent alignment with the interior portion of said first tubular member adjacent said bore in said first tubular member.

5. A connection comprising:
   a tubular fitting member;
   a first tubular member having a bore adapted to receive said tubular fitting member;
   a second tubular member having an inside diameter slightly larger than the outside diameter of said tubular fitting member to receive said tubular fitting member and having an end portion adapted to engage said first tubular member;
   a first fastening means to secure said tubular fitting member within said first tubular member, said first fastening means comprising stop means engageable to said tubular fitting member within said first tubular member and abutting said first tubular member around said bore when said tubular fitting member is urged in a removal direction, the stop means comprising at least one pin means engaging said fitting through at least one aperture in said fitting, said at least one pin means being held in a substantially coaxial and adjacent alignment with the interior portion of said first tubular member adjacent said bore in said first tubular member, a side of said pin means adjacent the interior wall of said first tubular member resting partially in a groove formed in said interior wall of said first tubular member; and,
   a second fastening means to secure said tubular fitting member within said second tubular member.

6. The connection of claim 5 wherein said pin means have tapered edges to form a snug, pressed fit in said apertures.

7. The connection of claim 6 wherein said apertures have tapered edges to coincide with the tapered edges of said pin means.

8. The connection of claim 5 wherein said second fastening means comprises aligned apertures in said tubular fitting member and said second tubular member, and pin means received therethrough.

9. The connection of claim 8 wherein said pin means have tapered edges to form a snug, pressed fit in said apertures.

10. The connection of claim 9 wherein said apertures have tapered edges to coincide with said tapered edges of said tapered pins.

11. The joint construction of claim 5 wherein said tubular fitting member is constructed of PVC.

12. The joint construction of claim 5 wherein said pin means through said apertures in said tubular fitting member and said second tubular member is colored to match the color of said first tubular member.

13. The joint construction of claim 5 wherein said pin means through said apertures in said tubular fitting member and said second tubular member is dimensioned and contoured to match the exterior contour of said second tubular member.

14. The joint construction of claim 5 wherein said pins are fashioned of aluminum.

15. The joint construction of claim 5 wherein said pins are constructed of stainless steel.

* * * * *